(12) United States Patent
Siegrist

(10) Patent No.: US 8,064,584 B2
(45) Date of Patent: Nov. 22, 2011

(54) METHOD AND APPARATUS FOR CROSS CHANNEL DATA PROCESSING

(75) Inventor: Joseph Siegrist, Vienna, VA (US)

(73) Assignee: Art Technology Group, Inc., Cambridge, MA (US)

( * ) Notice: Subject to any disclaimer, the term of this patent is extended or adjusted under 35 U.S.C. 154(b) by 1090 days.

(21) Appl. No.: 11/863,175

(22) Filed: Sep. 27, 2007

(65) Prior Publication Data

US 2008/0260135 A1 Oct. 23, 2008

Related U.S. Application Data

(63) Continuation-in-part of application No. 11/737,729, filed on Apr. 19, 2007, now Pat. No. 7,941,755.

(51) Int. Cl.
*H04M 3/42* (2006.01)
*H04M 3/00* (2006.01)

(52) U.S. Cl. ............. 379/201.02; 379/265.09

(58) Field of Classification Search ......... 379/201.02, 379/265.09; 370/352
See application file for complete search history.

(56) References Cited

U.S. PATENT DOCUMENTS

| | | | |
|---|---|---|---|
| 6,707,811 B2 * | 3/2004 | Greenberg et al. | 370/352 |
| 6,791,974 B1 | 9/2004 | Greenberg | |
| 6,914,899 B2 * | 7/2005 | Siegrist et al. | 370/354 |
| 7,000,185 B1 | 2/2006 | Murren et al. | |
| 7,174,506 B1 | 2/2007 | Dunsmoir et al. | |
| 7,203,188 B1 * | 4/2007 | Siegrist et al. | 370/352 |
| 7,272,659 B2 | 9/2007 | Fukuoka | |
| 7,356,606 B2 | 4/2008 | Choate | |
| 7,519,902 B1 | 4/2009 | Kraft et al. | |
| 2002/0035647 A1 * | 3/2002 | Brown et al. | 709/312 |
| 2002/0054126 A1 | 5/2002 | Gamon | |
| 2002/0198903 A1 | 12/2002 | Robison et al. | |
| 2003/0033227 A1 | 2/2003 | Heiser | |

(Continued)

FOREIGN PATENT DOCUMENTS

EP 0843454 A2 5/1998

OTHER PUBLICATIONS

"Co-Browse: Provide Online Visitors with Hands-On Assistance Whenever They Need it" date Unknown, Retrieved Apr. 2, 2007, http://www.liveperson.com/sb/cobrowse.asp.

(Continued)

*Primary Examiner* — Davetta W Goins
*Assistant Examiner* — Mohammad Islam
(74) *Attorney, Agent, or Firm* — Squire, Sanders & Dempsey (US) LLP

(57) ABSTRACT

A method and system for placing a call back from a call center to an end user viewing a website includes sending a request for the call back from an end user computer to a call server, the request including the PSTN number at which the end user wishes to be called; placing calls to the end user and the call center, the call center call including the ANI/callerID of the number at which the end user is called; requesting by the call center data concerning the end user from the call server; receiving by the call server data from the end user computer; and transmitting the data from the call server to the call center. The data from the end user computer may be an identification of the web page being viewed, data entered on the web page, an end user identifier and/or co-browsing data.

15 Claims, 3 Drawing Sheets

U.S. PATENT DOCUMENTS

| | | | |
|---|---|---|---|
| 2003/0083938 A1 | 5/2003 | Smith et al. | |
| 2003/0093585 A1 | 5/2003 | Allan | |
| 2003/0101412 A1 | 5/2003 | Eid | |
| 2003/0110266 A1 | 6/2003 | Rollins et al. | |
| 2003/0204753 A1 | 10/2003 | Raley et al. | |
| 2004/0028213 A1* | 2/2004 | Goss | 379/265.09 |
| 2004/0039846 A1* | 2/2004 | Goss et al. | 709/248 |
| 2004/0075686 A1 | 4/2004 | Watler et al. | |
| 2004/0119727 A1 | 6/2004 | Dietz et al. | |
| 2004/0201615 A1 | 10/2004 | Dietz et al. | |
| 2004/0258089 A1 | 12/2004 | Derechin et al. | |
| 2005/0162680 A1 | 7/2005 | Sekiguchi et al. | |
| 2005/0198572 A1 | 9/2005 | Quiller et al. | |
| 2005/0204281 A1 | 9/2005 | Choate | |
| 2006/0010134 A1 | 1/2006 | Davis et al. | |
| 2006/0053224 A1 | 3/2006 | Subramaniam | |
| 2006/0179155 A1 | 8/2006 | Bunting et al. | |
| 2007/0061412 A1 | 3/2007 | Karidi et al. | |
| 2007/0061421 A1 | 3/2007 | Karidi | |
| 2007/0061467 A1 | 3/2007 | Essey et al. | |
| 2007/0078810 A1 | 4/2007 | Hackworth | |
| 2007/0156592 A1 | 7/2007 | Henderson | |
| 2007/0186150 A1 | 8/2007 | Rao et al. | |
| 2008/0109472 A1 | 5/2008 | Underwood et al. | |
| 2008/0229233 A1 | 9/2008 | Blattner | |
| 2008/0267377 A1* | 10/2008 | Siegrist | 379/201.02 |
| 2008/0306794 A1 | 12/2008 | Cohen | |
| 2008/0313306 A1 | 12/2008 | Skog | |
| 2009/0024748 A1 | 1/2009 | Goldspink et al. | |
| 2010/0128720 A1* | 5/2010 | Goss | 370/352 |
| 2010/0205079 A1* | 8/2010 | Ferguson et al. | 705/34 |

OTHER PUBLICATIONS

"Page Viewer: Tired of Guessing What Your Visitors are Looking at and Trying to Decipher Complex URLs?", date unknown, Retrieved Apr. 2, 2007, http://www.liveperson.com/sb/pageviewer.asp.

LivePerson: Engage Your Online Customers in Real Time, date unknown, Retrieved Apr. 2, 2007, http://www.liveperson.com/index.asp.

"LivePerson: About Us", date unknown, Retrieved Apr. 2, 2007, http://www.liveperson.com/about/.

File History of U.S. Appl. No. 11/737,729 electronically captured on Jun. 10, 2010.

File History of U.S. Appl. No. 12/489,564 electronically captured on Jun. 10, 2010.

* cited by examiner

METHOD AND APPARATUS FOR CROSS CHANNEL DATA PROCESSING

CROSS REFERENCE TO RELATED APPLICATIONS

This application is a continuation-in-part of co-pending U.S. patent application Ser. No. 11/737,729, entitled "Method and Apparatus for JavaScript Co-Browsing," the entire contents of which are incorporated herein by reference.

BACKGROUND

The use of the Internet has become widespread over the last decade, and an important use of the Internet is e-commerce. One way in which e-commerce is conducted is through the use of websites with web pages that contain information about products and services being offered for sale by a merchant. Whether or not a web page offers the opportunity to make purchases online, users of web pages often find themselves in situations in which human assistance is desirable. One method in such assistance may be rendered is through the provision of an icon which, when activated, will result in the establishment of a phone call or text chat with a customer service agent at a call center. The phone call can be a pure VOIP (voice over internet protocol) phone call, a mixed VOIP-PSTN (public switched telephone network) call, or a pure PSTN call, which can be a "call back" call from a call center directly to a consumer or a "call back" call facilitated by a third party service provider in which the third party service provider places a first call to the user of the website at a number provided by the user and a second call to a call center and then bridges the first call to the second call. Another method in which communication between a user and a customer service agent may be established is through a text chat connection.

When a call or text chat connection is established between a user of a website and a customer service agent, it is desirable for the customer service agent to be able to view the web page being seen by the user, or selected portions thereof, so that the customer service agent can assist the user more easily, and/or control the display on the end user's computer. A method for collecting and sharing such data is disclosed in co-pending U.S. patent application Ser. No. 11/737,729, entitled "Method and Apparatus for JavaScript Co-Browsing." Other methods for sharing web page information between an end user on a web site and a recipient of a phone call initiated from such a web site are also possible.

DETAILED DESCRIPTION

As discussed above, in a pure PSTN callback, an end user clicks on an icon of the website and enters a PSTN telephone number at which they wish to receive a PSTN phone call (as used herein, a PSTN phone call should be understood to include a call that is placed using a PSTN telephone number even if the call is received by the end user over a broadband Internet connection using a VOIP technology such as that provided to consumers by VONAGE). One method to complete such a call is to instruct a gateway to place a call to the end user at the PSTN telephone number associated with that end user, place a second call to the call center associated with the web page being viewed by the end user, and bridge the two calls. In such a scenario, the incoming call to the call center will include the ANI or caller ID of the gateway rather than the end user. As discussed in U.S. Pat. No. 6,914,899, this is problematic because many call centers employ sophisticated call management and customer relationship management systems that use the ANI or callerID of an incoming call to identify the end user and retrieve information related to the end user. Thus, a technique that will allow such call center systems to continue using the ANI/callerID to retrieve end user information and provide additional information from one or more web pages being viewed by the end user is desirable.

Figure 1:
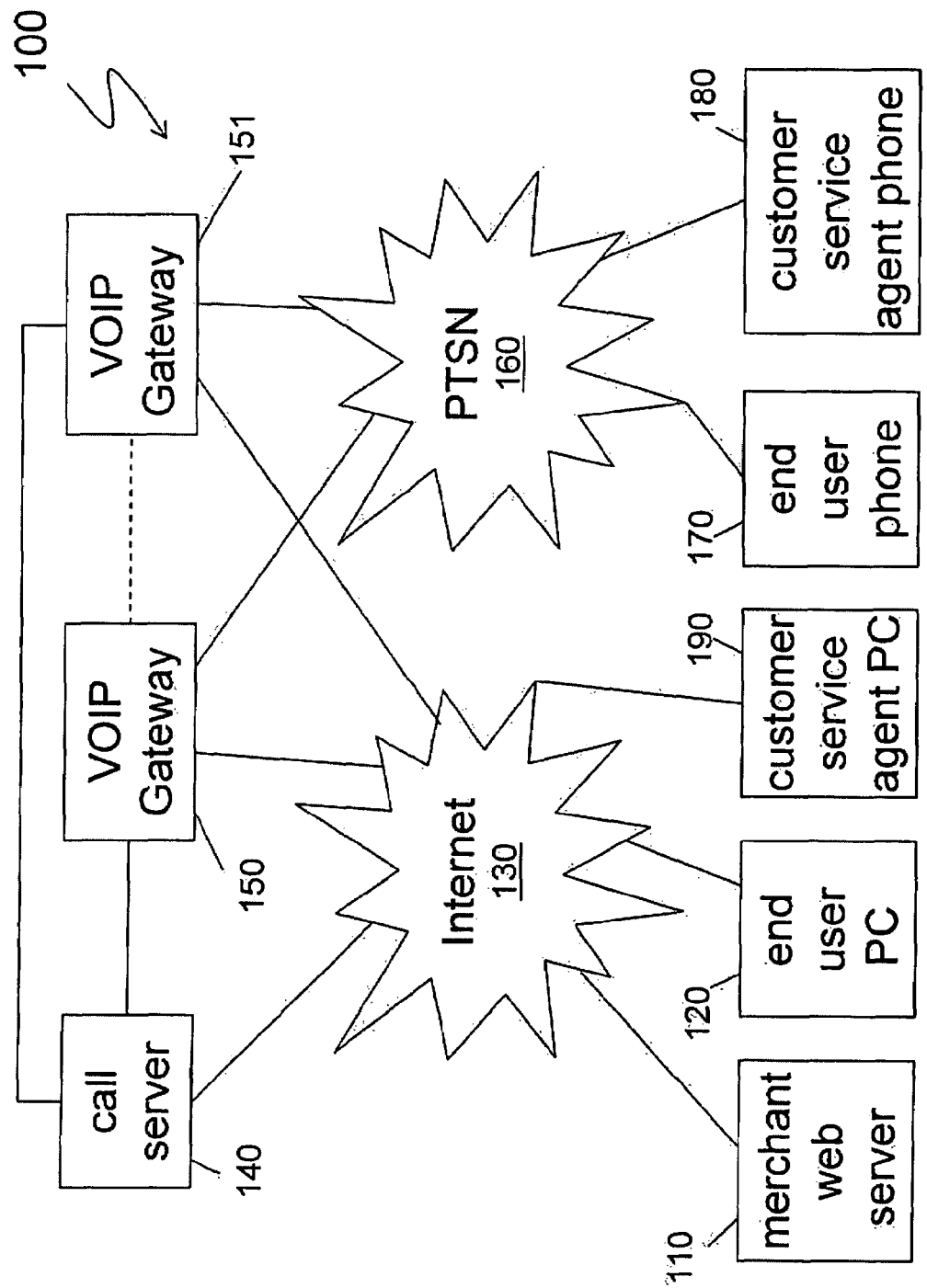
FIG. 1 is a block diagram of a system for cross channel data processing according to an embodiment of the invention.
Figure 2:
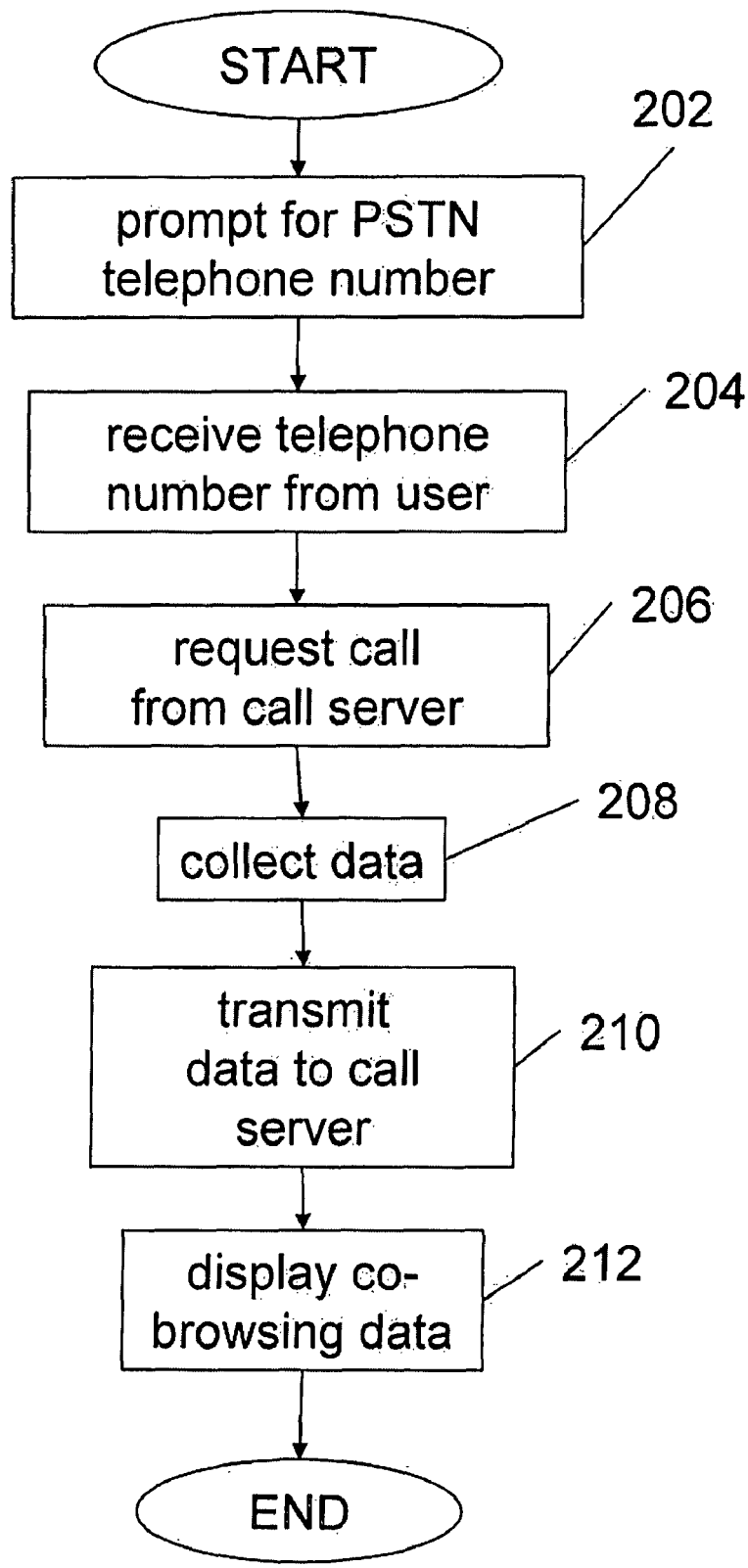
FIG. 2 is a flowchart of a method performed by the end user PC of FIG. 1 according to an embodiment of the invention.

A technique for providing information from one or more web pages being viewed by an end user to a call center while allowing the call center to continue using the information retrieval mechanisms making use of an ANI or callerID associated with the end user will be discussed below in connection with FIGS. 1 and 2. FIG. 1 illustrates a system 100 on which such a method may be performed. The system 100 includes a merchant web server 110 to which an end user at an end user PC 120 may connect via the Internet 130 to view one or more merchant web pages served by the merchant web server 110. At least one of the merchant web pages includes an icon that indicates an option for a phone call from the merchant's call center to the end user. In some embodiments of the invention, a web page served by the merchant web server 110 may include JavaScript code that will download other JavaScript commands to facilitate the collection of data (e.g., identifiers of the end user, identifiers of the web page being viewed, information entered into various fields of a web page by the end user) from the website and/or co-browsing as described in the aforementioned co-pending application.

Activation of the icon by the end user results in a message being sent from the end user PC 120 to a call server 140. The call server 140 is connected to a pair of VOIP gateways 150, 151 which can be used to place a pure PSTN callback call via the PSTN 160 to an end user phone 170 using a first gateway 150 and bridge the call to second call placed to a customer service agent phone 180 via the PSTN 160 using a second gateway 151 as discussed in the aforementioned co-pending application. Those of skill in the art will recognize that the first and second calls may be bridged by connecting an input of the first VOIP gateway 150 to an output of the second VOIP gateway 151 and an output of the first VOIP gateway 150 to an input of the second VOIP gateway 151. Those of skill in the art will also recognize that other devices for placing the calls to the end user and the call center may be used in place of the pair of VOIP gateways 150, 151. In addition to placing the call, the call server 140 also performs the task of downloading VOIP software to the end user PC 120 if the end user PC 120 is not already equipped with such software. The VOIP software is preferably of the thin-client type such as that disclosed in U.S. Pat. No. 6,914,899. The call server 140 controls the second gateway 151 call is made such that the ANI or callerID corresponding to the telephone number supplied by the end user when requesting the call back is included in the second call to the customer service agent phone 180. Finally, the system 100 includes a customer service agent PC 190 to which information from and pertaining to the merchant web pages is sent by the call server 140.

Operation of end user PC 120 of the system 100 according to an embodiment of the invention will now be discussed with reference to the flowchart 200 of FIG. 2. The process starts when the user clicking on an icon, which may be labeled as PUSH TO TALK™ or some other legend which indicates the availability of a telephone conference with a live person, on a web page hosted by the merchant web server 110. This triggers the execution of JavaScript commands that perform the steps discussed below (as discussed in the aforementioned application, the JavaScript commands may be included in the web page itself, of may be downloaded at some time after the web page on which the icon resides is downloaded). In some embodiments, the icon may be solely directed to a PSTN callback process, in which case the end user is immediately prompted by the JavaScript commands to enter a PSTN telephone number at which they wish to receive the callback at step 202. In other embodiments, the end user also has the option for a VOIP call, in which case the prompt for the end user phone number at step 202 only occurs when the user indicates that they wish to be contacted via a PSTN callback.

The end user phone number is received at step 204. Next, the end user PC sends a request including the user-entered telephone number to the call server 140 at step 206. The end user PC then collects data at step 208. In some embodiments, the data collected can be a copy of the web page being viewed by the user. One method for doing this is described in FIG. 2 of the aforementioned co-pending application, which can include co-browsing. In other embodiments, the information is simpler and may be, for example, stored in a cookie on the end user's PC. Those of skill in the art will recognize that other methods for collecting data for transmission to a call center via the call server 140 are also possible. Once the desired data has been collected, it is transmitted to the call server 140 at step 210. In some embodiments, the process is complete at this point. In other embodiments, such as those that implement the co-browsing-option discussed in the aforementioned co-pending application, data received from the call server 140 (discussed in further detail below in connection with FIG. 3) may be displayed to the end user at step 212, and steps 210 and 212 may involve repeated transmissions of data during the co-browsing session.

Figure 3:
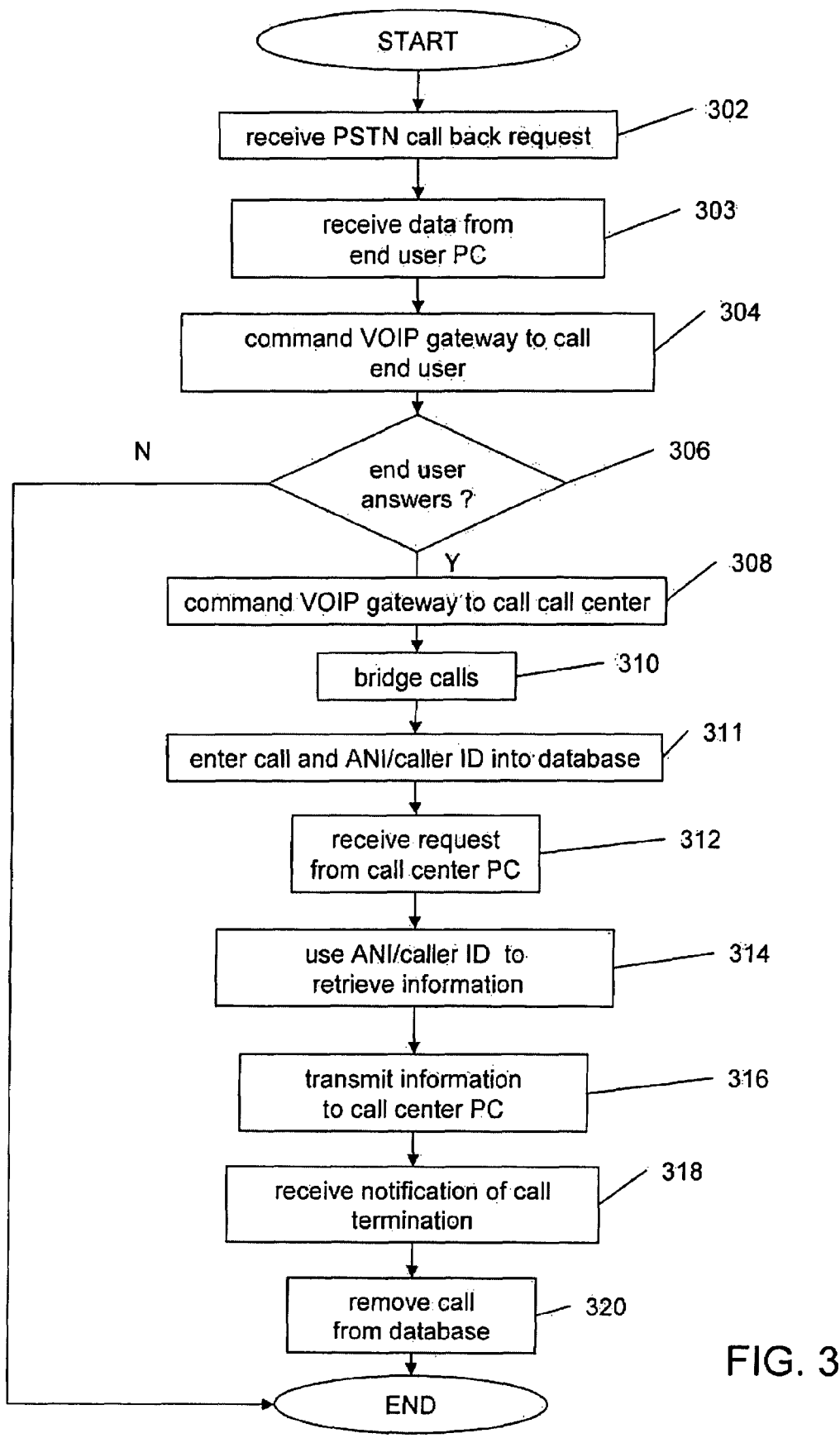
FIG. 3 is a flowchart of a method performed by the call server of FIG. 1 according to an embodiment of the invention.

Operation of the call server 140 in an embodiment of the system 100 will now be discussed with reference to the flowchart 300 of FIG. 3. The process begins when the call server receives a request for a PSTN call back at step 302. The call server 140 also receives the data which was collected and transmitted by the end user PC (discussed above in connection with step 210) at step 301 (those of skill will recognize that this step may occur later in the process discussed below). The call server 140 extracts the PSTN phone number in the request and commands a first VOIP gateway 150 to call the end user telephone 170 using the PSTN phone number in the request at step 304. If the end user answers the call at step 306, the call server 140 then commands a second VOIP gateway 151 to place a call to the call center phone 180 at step 308, including the telephone number received in the request as the ANI (or callerID). The calls to the end user and call center are then bridged at step 310 and the call is entered into a database of ongoing calls at step 311.

The call center routes the call to a customer service agent at a customer service agent telephone 180 (it will be understood by those of skill in the art that such a "telephone" may be a stand alone device or may be integrated into a personal computer, or may be converted from a PSTN call to a VOIP call internal to the call center, or may be handled using any number of techniques in a manner well known to those of skill in the art). Because the ANI (or callerID) is included in the phone call, the existing CRM (customer relationship management) system at the call center can use the ANI of the incoming call to retrieve data related to the end user (sometime referred to as a screen pop) without modification. However, the call center may have incomplete or no information in its database for the ANI associated with the incoming call. Moreover, the call center will not have information such as the identity of the web page currently being viewed by the end user at the end user PC 120 or information entered into such web page by the end user. The call center can therefore pass the ANI (or callerID) information to the customer service agent PC 190, which can send a request for such information, the request including the ANI, to the call server 140. This look up could also be done at the ACD or switch which would pass the information gathered along to be shown in the screen-pop.

The call server 140 receives a request for information along with the accompanying ANI (or callerID) from the customer service agent PC 190 at the call center at step 312. The call server 140 then searches through its database of current calls for a matching ANI (or callerID) and retrieves the data received from the end user PC during step 301 at step 314. The information is transmitted to the customer service agent PC 190 at the call center at step 316, and the process is complete. It should be understood that step 316 will involve the transmission of multiple messages to the customer service agent PC 190 and will also involve the transmission of co-browsing information to the end user PC 120 in embodiments that include co-browsing as described in the aforementioned application. The process ends when the call server receives notification at step 318 from one or both of the gateways 150, 151 that the corresponding party has ended the call by hanging up, at which point the call server removes the corresponding call from the active call database at step 320.

It should be understood that the call to the end user can also be a VOIP call. In such an embodiment, the call server establishes a VOIP connection to the end user computer, creates a fictional ANI (e.g., an ANI including a non-existent area code), and inserts the fictional ANI into the PSTN call to the call center. The call server then enters the fictional ANI into its active call database in the same manner that a PSTN call to the end user is entered in to the database. The call center would not be able to do a screen pop using the fictional ANI during the first call from the end user (this is like a situation in which an existing customer calls from a new phone number), but would be able to request information from the call server using the fictional ANI. The call server, upon receiving such a request, provides the end user data to the call center in the same manner as discussed above.

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for establishing a phone call between an end user and a third party comprising the steps of:

receiving a call back request from an end user computer associated with an end user for a public switched telephone network (PSTN) call from a third party associated with a third party computer and a third party PSTN phone number, the call back request including an end user PSTN telephone number at which the end user wishes to receive the PSTN call;

placing a first call to the end user PSTN phone number included in the request;

placing a second call to the third party PSTN phone number, the second call including the end user PSTN phone number;

bridging the first and second phone calls;

receiving end user data from the end user computer;

receiving a request for end user data from the third party computer, the request for end user data including the end user PSTN phone number;

retrieving the end user data associated with the end user PSTN phone number from a database; and transmitting the end user data to the third party computer.

2. The method of claim 1, wherein the end user PSTN number is included in the call to the third party PSTN number as callerID information.

3. The method of claim 1, wherein the end user PSTN number is included in the call to the third party PSTN number as automatic number identification (ANI) information.

4. The method of claim 1, wherein the end user data includes an end user identifier.

5. The method of claim 1, wherein the end user data includes information pertaining to a web page being viewed on the end user computer.

6. The method of claim 1, wherein the end user data includes a copy of a web page being viewed on the end user computer, or a URL (uniform resource locator) to such data.

7. An apparatus for cross channel data processing, the apparatus comprising:

an end user computer;

a server in communication with the end user computer, the server being configured to host a third party website;

a call server in communication with the end user computer;

a third party computer in communication with the call server;

an end user telephone; and a third party telephone;

wherein the end user computer is configured to perform the steps of transmitting a call back request for a call to the end user telephone to the call server, the request including a PSTN telephone number associated with the end user;

transmitting end user data to the call server; and wherein the call server is configured to perform the steps of receiving the call back request from the end user computer;

placing a first call to the end user PSTN phone number included in the request;

placing a second call to the third party telephone, the second call including the end user PSTN phone number;

bridging the first and second phone calls;

receiving the end user data from the end user computer;

receiving a request for end user data from the third party computer, the request for end user data including the end user PSTN phone number;

retrieving the end user data associated with the end user PSTN phone number from a database; and transmitting the end user data to the third party computer.

8. The apparatus of claim 7, wherein the end user PSTN number is included in the call to the third party PSTN number as callerID information.

9. The apparatus of claim 7, wherein the end user PSTN number is included in the call to the third party PSTN number as automatic number identification (ANI) information.

10. The apparatus of claim 7, wherein the end user data includes an end user identifier.

11. The apparatus of claim 7, wherein the end user data includes information pertaining to a web page being viewed on the end user computer.

12. The apparatus of claim 7, wherein the end user data includes a copy of a web page being viewed on the end user computer.

13. The apparatus of claim 7, further comprising a first voice over internet protocol (VOIP) gateway and a second VOIP gateway in communication with the call server, wherein the first call is placed using the first VOIP gateway, the second call is placed using the second VOIP gateway, and the first and second calls are bridged by connecting an input of the first VOIP gateway to an output of the second VOIP gateway and an output of the first VOIP gateway to an input of the second VOIP gateway.

14. The apparatus of claim 7, wherein the first call and the second call are completed entirely over the PSTN.

15. A method for establishing a phone call between an end user and a third party comprising the steps of:

receiving a call request from an end user computer associated with an end user for call from a third party associated with a third party computer and a third party PSTN phone number;

establishing a VOIP call to the end user computer;

placing a second Call to the third party PSTN phone number, the second call including a fictional phone number;

bridging the first and second phone calls;

receiving end user data from the end user computer;

receiving a request for end user data from the third party computer, the request for end user data including the fictional phone number;

retrieving the end user data associated with the fictional phone number from a database; and transmitting the end user data to the third party computer.

* * * * *